Figure 7:
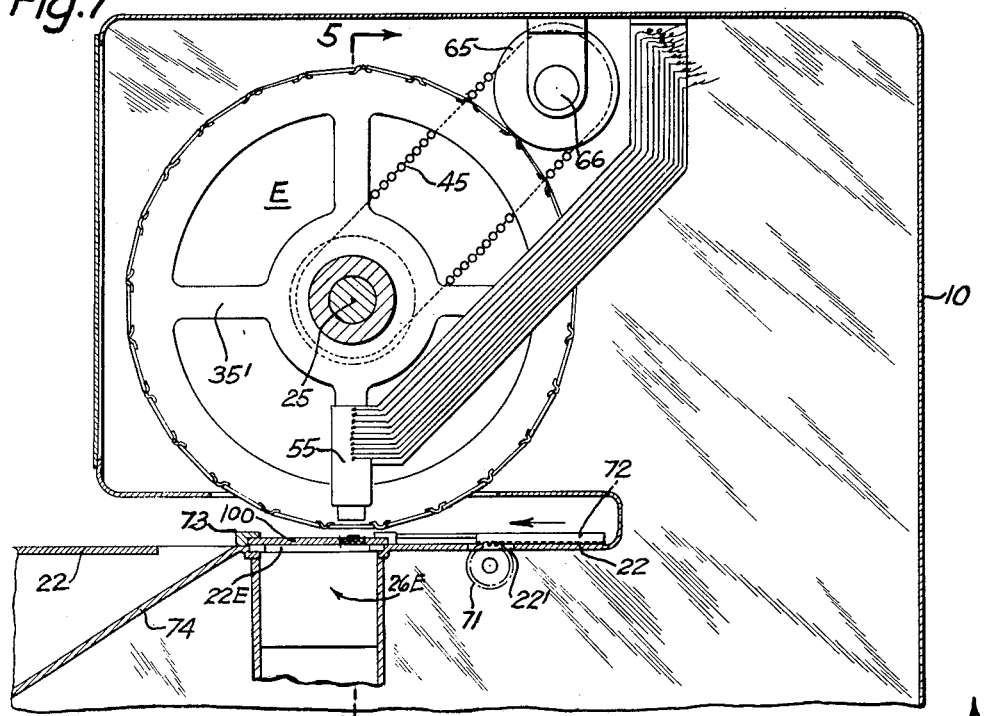

Dec. 4, 1962 H. A. TOULMIN, JR 3,066,798
ARRANGEMENT FOR READING OUT CARDS AND SORTING DEVICE THEREFOR
Filed Jan. 25, 1961 6 Sheets-Sheet 1
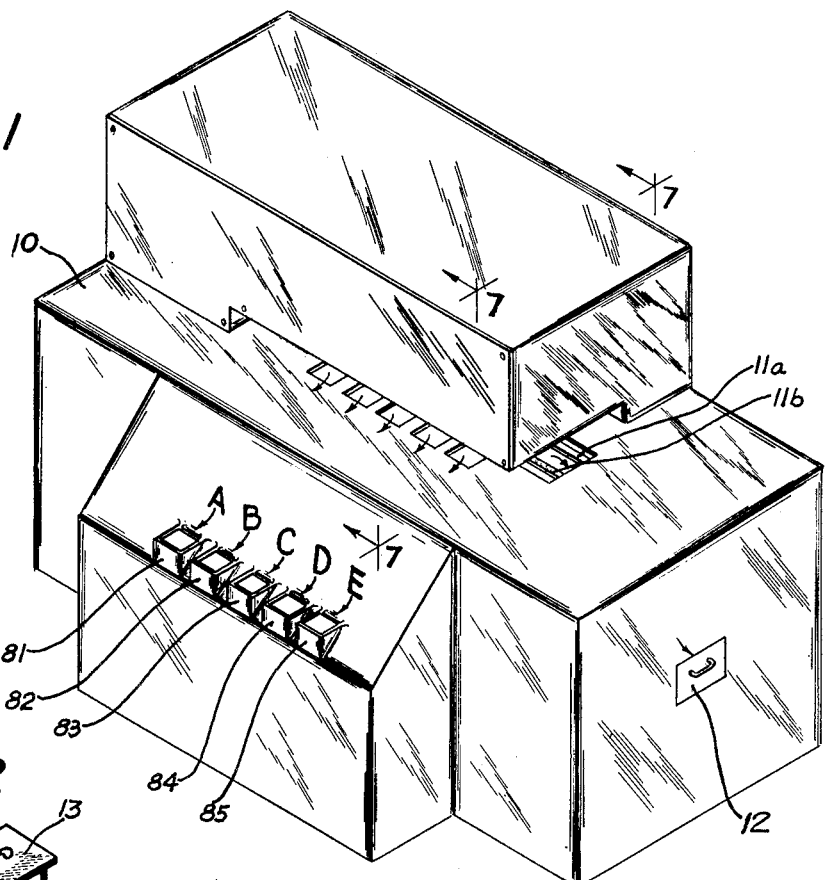
Fig. 1
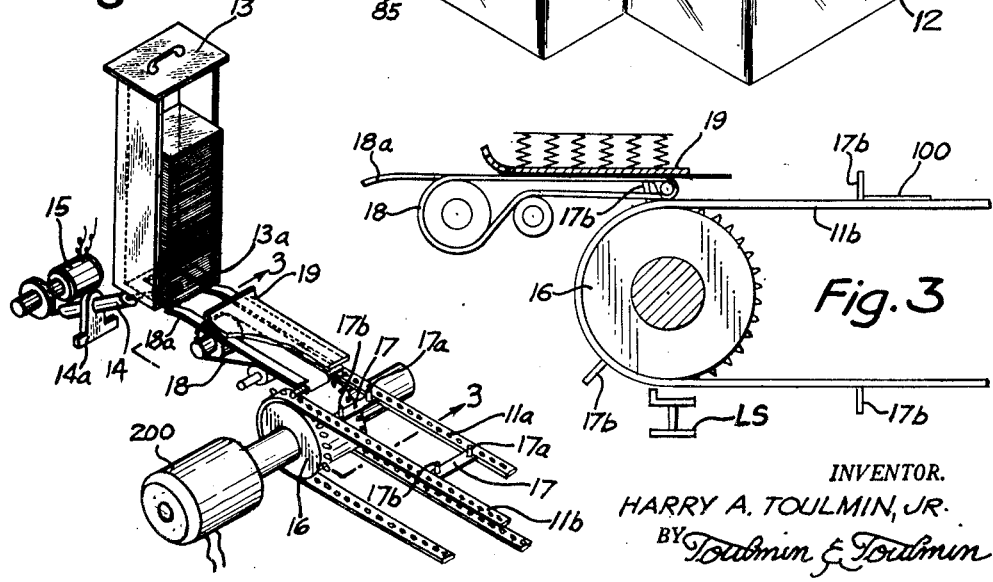
Fig. 2
Fig. 3
INVENTOR.
HARRY A. TOULMIN, JR.
BY Toulmin & Toulmin
Attorneys Dec. 4, 1962     H. A. TOULMIN, JR     3,066,798
ARRANGEMENT FOR READING OUT CARDS AND SORTING DEVICE THEREFOR
Filed Jan. 25, 1961     6 Sheets-Sheet 2
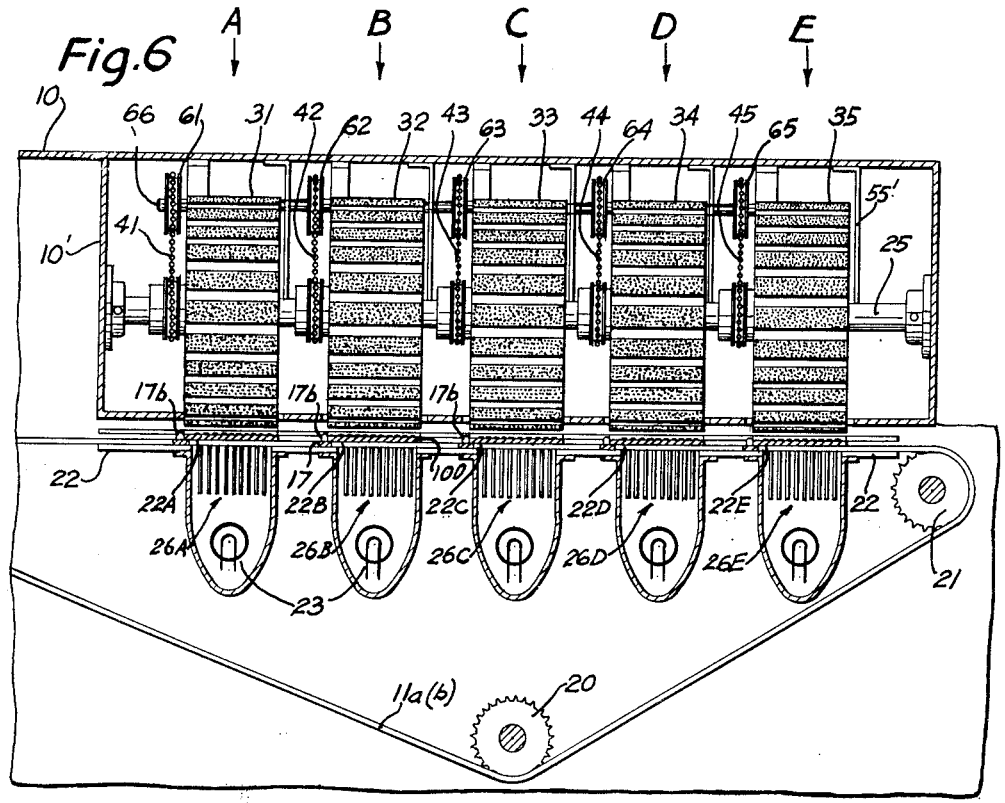
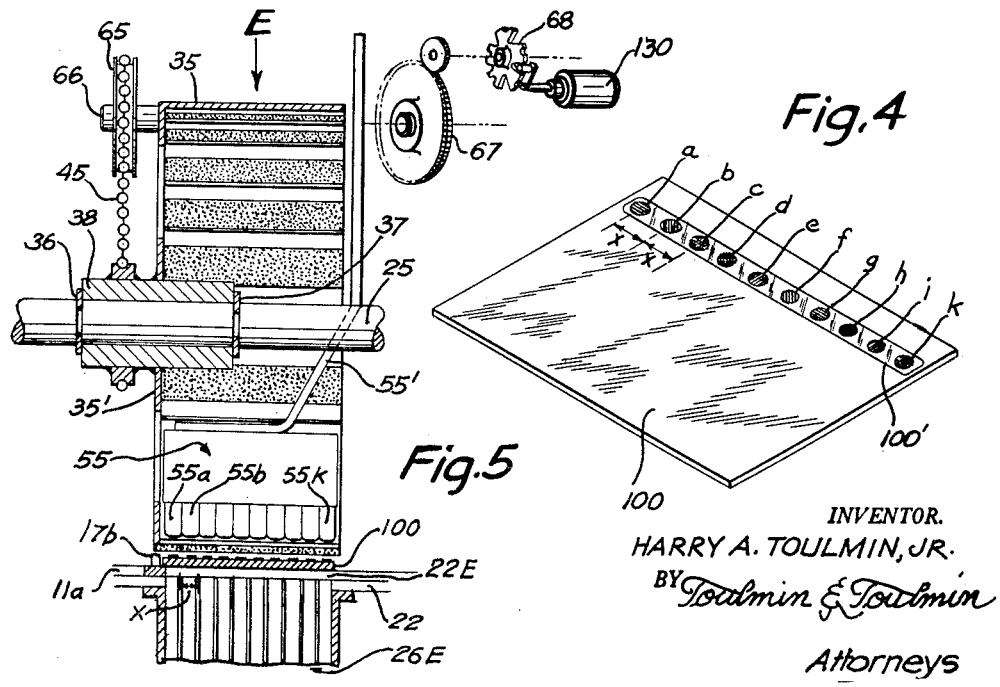
INVENTOR.
HARRY A. TOULMIN, JR.
BY Toulmin & Toulmin
Attorneys Dec. 4, 1962 H. A. TOULMIN, JR 3,066,798
ARRANGEMENT FOR READING OUT CARDS AND SORTING DEVICE THEREFOR
Filed Jan. 25, 1961 6 Sheets-Sheet 3

INVENTOR.
HARRY A. TOULMIN, JR.
BY Toulmin & Toulmin
Attorneys

Dec. 4, 1962      H. A. TOULMIN, JR      3,066,798
ARRANGEMENT FOR READING OUT CARDS AND SORTING DEVICE THEREFOR
Filed Jan. 25, 1961      6 Sheets-Sheet 4

INVENTOR.
HARRY A. TOULMIN, JR.
BY Toulmin & Toulmin
Attorneys

Dec. 4, 1962     H. A. TOULMIN, JR     3,066,798
ARRANGEMENT FOR READING OUT CARDS AND SORTING DEVICE THEREFOR
Filed Jan. 25, 1961     6 Sheets-Sheet 5

INVENTOR
HARRY A. TOULMIN, JR.
By Toulmin & Toulmin
Attorneys

_United States Patent Office_

3,066,798
Patented Dec. 4, 1962

3,066,798
ARRANGEMENT FOR READING OUT CARDS AND SORTING DEVICE THEREFOR
Harry A. Toulmin, Jr., Dayton, Ohio, assignor to The Commonwealth Engineering Company of Ohio, Dayton, Ohio
Filed Jan. 25, 1961, Ser. No. 84,906
8 Claims. (Cl. 209—111.5)

The present application relates to record cards and an arrangement for reading out information or identification patterns stored by encoding on such cards, and for sorting out cards which contain a predetermined content of such information or identification.

Cards for storing information are widely known, and they are usually small type cardboard cards having an identifying information impressed thereon by punched holes at predetermined locations thereof. The card then is identified by the particular combination of the locations of such holes. In addition, these cards usually contain written and/or printed information which are to be legible by humans. The biggest disadvantage of information cards of this type is that the punched holes mutilate wholly or partly some of the letters, lines, digits or other information printed upon such card.

While the punched holes define information necessary for proper identification of each card, the really important subject matter thereof mostly is the written information thereon.

It is a primary object of the present invention to provide a new system for reading out the identifying information of such cards which identifying information is preferably printed along one margin or edge thereof, while the large or even larger than the number of identifying possibilities by way of punched holes as known in the prior art.

It is a primary feature of the present invention to provide cards with identifying information in form of a row of spaced colored dots printed along one edge of such card whereby the colors are selected from a pre-determined number of colors.

It is another feature of the present invention to provide for a new and improved read-out and sorting device capable of identifying any combination of colored dots positioned along one side of one margin of an information card, and further capable of matching such combination against a pre-selected one.

It is another feature of the present invention to provide color sensitive probing means for each particular dot as positioned on such type of cards, which probing means is capable of distinguishing between all of the possible colors for which the color of this dot may be selected; further means are provided to combine the outputs from all the probing devices for testing whether or not the card under observation matches a predetermined color dot combination.

With such a card, one dot can for example have fifteen different colors. Only one spot or a small area is needed on a card to provide the necessary space for this dot so as to include all of its fifteen possible identifying colors. For the same amount of possibilities, a strip or column is needed on a card if punched holes are used with fifteen different locations of such hole. It is apparent that the identification pattern for a card according to the invention does not mutilate other information thereon.

While the specification concludes with claims particularly pointing out and distinctly claiming the subject matter which is regarded as the invention, it is believed that the object and features of the invention and further objects, features and advantages thereof will be better understood from the following description taken in connection with the accompanying drawings in which:

FIG. 1 illustrates in a perspective, overall view an apparatus for reading out and ejecting cards, in general.

Figure 8:
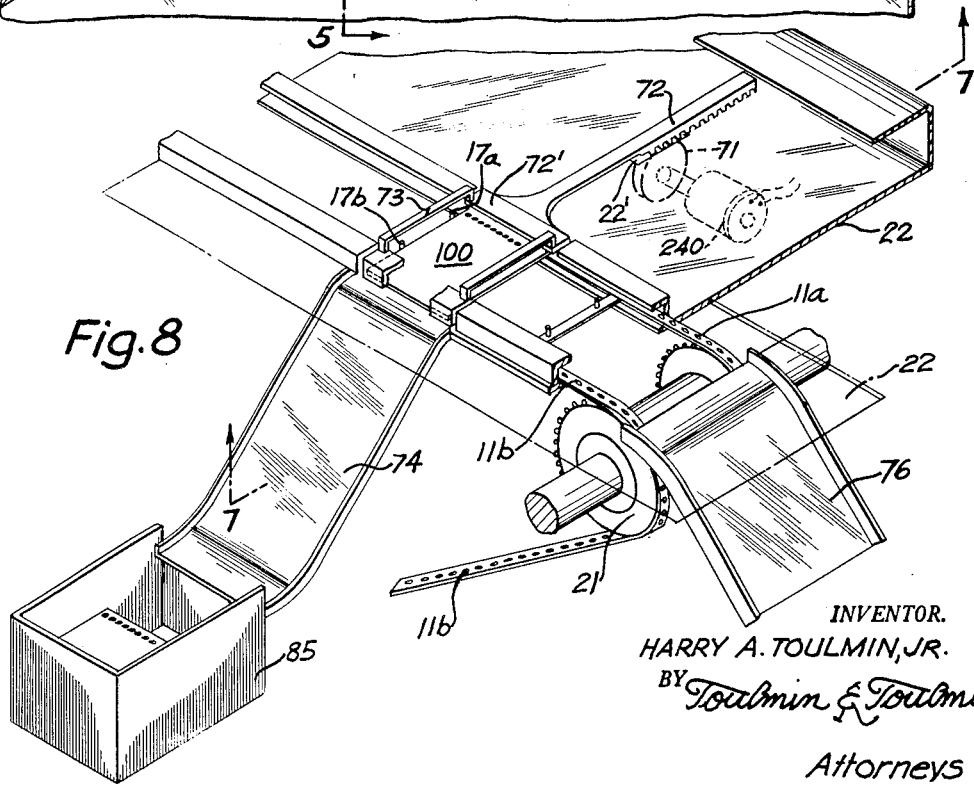
Figure 9:
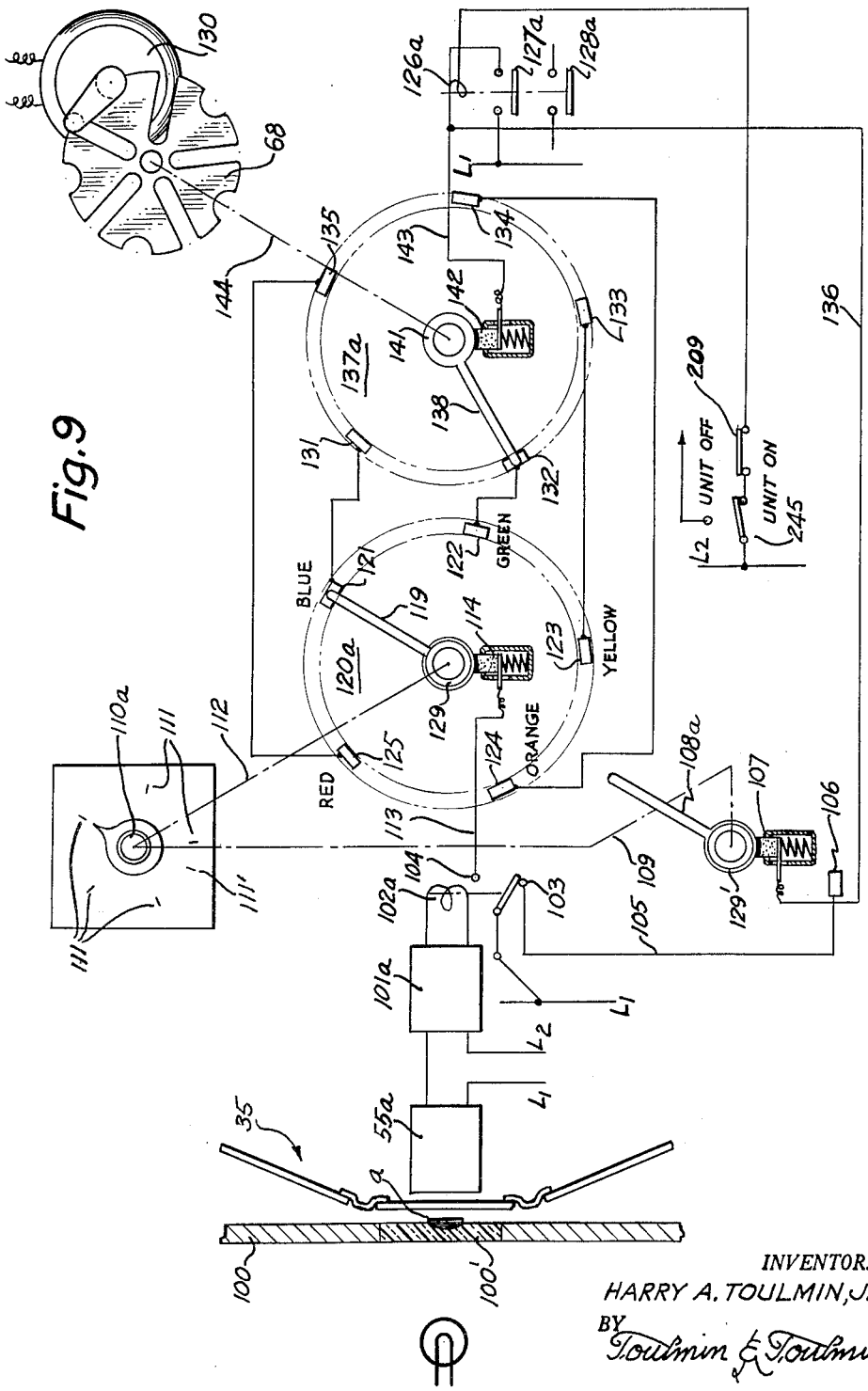
Figure 10:
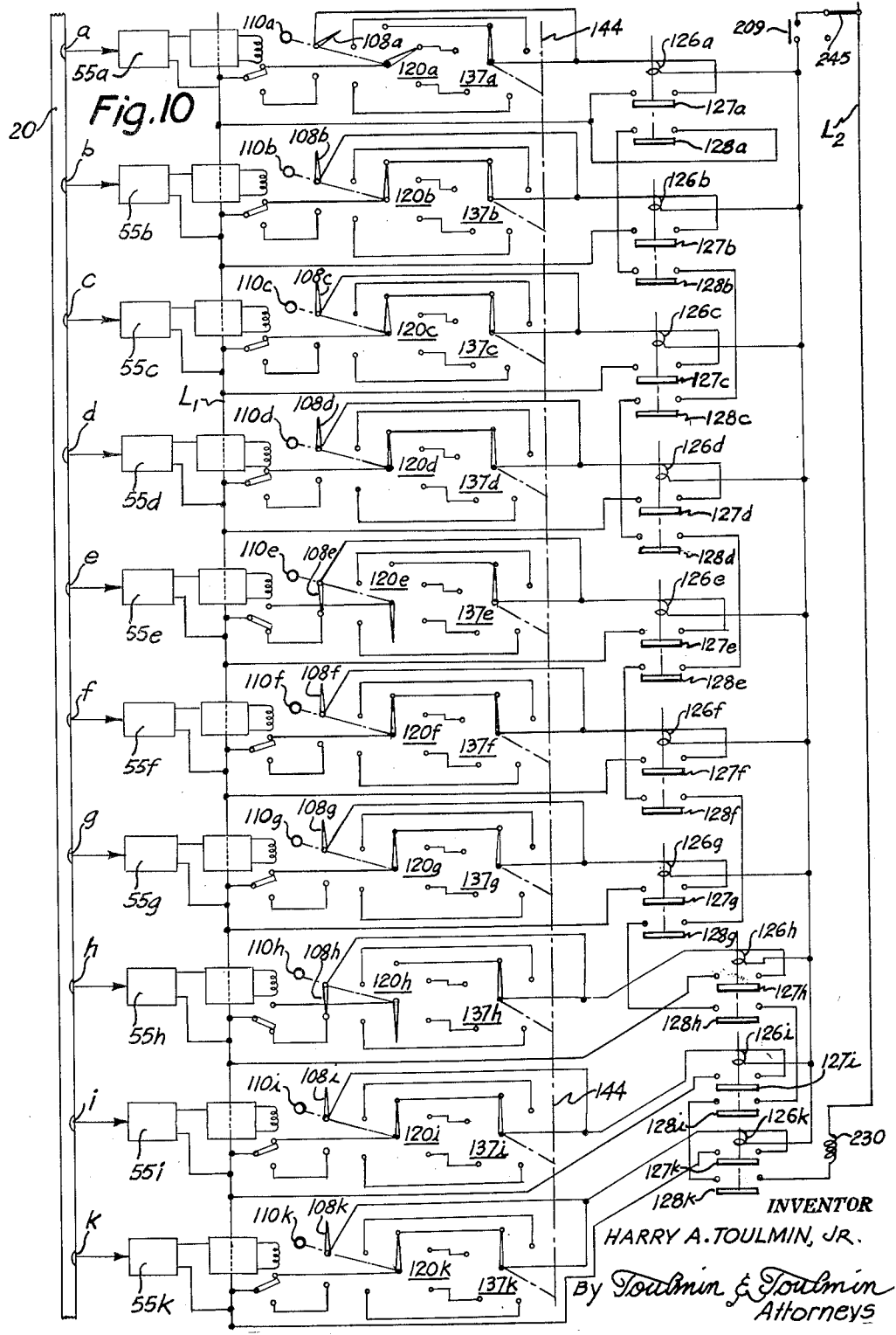
Figure 11:
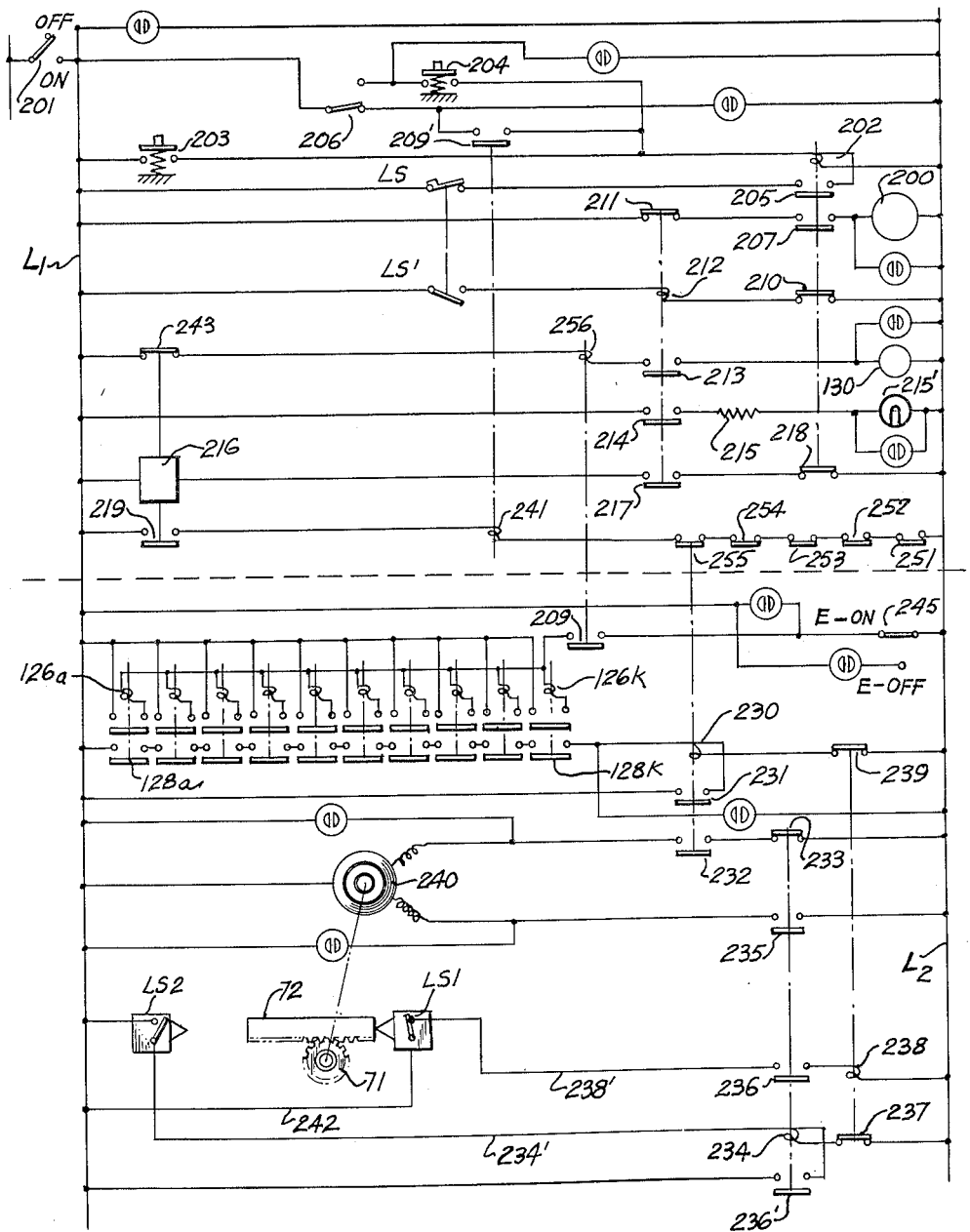

FIG. 2 is a perspective view showing an arrangement for feeding cards from a stack of cards onto a conveyor belt running through the apparatus illustrated in FIG. 1, FIG. 3 is a side view of a part of the arrangement of FIG. 2 for feeding cards onto a conveyor belt, FIG. 4 shows a perspective view of an encoded card according to the present invention, particularly illustrating how the colored dot code pattern is placed thereon, FIG. 5 is a sectional view of a turret for one of the viewing stations illustrated in FIG. 4, FIG. 6 is a partial sectional, partial elevated view showing five viewing or read-out stations for simultaneous operation, positioned inside of the apparatus shown in FIG. 1, FIG. 7 is a different, sectional view through one of the turrets shown in FIG. 6, also showing the relationship of a card under observation and optical scanning and probing means therefore, FIG. 8 is a perspective view of a card ejecting arrangement pertaining to one of the read-out stations illustrated in FIGS. 6 and 7, FIG. 9 illustrates schematically one detector channel for probing one dot in one of the read-out stations, FIG. 10 is a circuit diagram including a coincidence network for all the detector channels for one read-out station, and FIG. 11 is a circuit diagram illustrating the relationship and electric connections between a coincidence circuit for one read-out station and its associated card ejector mechanism and the driving and stopping mechanism for the conveyor belt feeding cards into the apparatus in accordance with the present invention.

Turning now to the detailed description of the drawing, particularly to FIGS. 1 to 8, it will be noted that here and throughout this specification, reference characters A, B, C, D, and E denote five different read-out stations, each one being equipped with a photo-electric probing or scanning device, color selectively probing the various cards as to the color content of the identification dots printed thereon; each station is also equipped with an ejecting mechanism.

In FIG. 1, the letters A to E have been used to characterize also the five different outlets channels having trays 81, 82, 83, 84 and 85 which are served from the ejecting mechanism in each read-out station. The arrows denote the movement of the cards when subjected to an ejection. Furthermore in FIG. 1 is visible a small portion of a conveyor belt being composed of two flexible strips, 11a and 11b, for moving the cards under the probing devices in the read-out stations to be explained later in this specification.

Reference numeral 12 designates a tray in which all of those cards will be collected which have not been ejected by and in any of the read-out stations.

Before continuing the description of the apparatus involved, reference is made to FIG. 4, illustrating a card denoted with reference numeral 100. This card can be made of cardboard or any other suitable material; in the present case it is assumed that the card has a transparent portion 100′ along one of its margins, and there are provided ten equi-spaced colored dots, having a space –X– between neighboring dots. These dots are designated by $a, b, c, d, e, f, g, h, i$ and $k$ and each may have a color selected from a number of predetermined colors. The number of colors from which one can select them is limited only by their electronical distinguishability, which is about fifteen. In the instant case, the dots will serve as color filters; this will be explained more fully later in this specification. Their color, therefore, is to be understood as the color of the light permitted to pass them. The dot arrangement or pattern as illustrated is only one example; one can have these dots arranged anywhere on the card, preferably at some free space, a corner, all four corners, etc.

FIGS. 2 and 3 illustrate the arrangement which can be referred to as the card input or feeding device and there is shown a stack of cards in a tray 13 having an opening 13A on its bottom where an ejector rod 14 engages always the lowest card. Ejector rod 14 is moved back and forth in a stationary frame 14a by a motor 15 which motor preferably runs simultaneously and in parallel with a feed motor 200 driving a drum 16 for advancing the conveyor belt 11a—11b. The two strips 11a and 11b are provided with punched holes engaging teeth of drum 16 for driving. The strips 11a and 11b are combined in a unitary structure thus forming the conveyor belt by cross bars 17 being provided with small lugs 17a and 17b. The cross bars 17 are separated from each other and it will become more apparent later in this specification that their mutual distance is precisely the distance between neighboring read-out stations.

The studs 17b serve for the actuation of a limit switch LS which limit switch is atcuated in synchronism with the positioning of cards under the read-out stations. The function of the limit switch LS will also be more apparent later in the specification.

From the stack of cards, always the lowest card is moved in steps by rod 14 upon a rack 18a. A card conveyor belt 18 assists this movement of the card along rack 18a against pressure exerted by a pressure plate 19 against the cards. Belt 18 frictionally engages the cards and moves them toward the end thereof. The cards are gripped by lugs 17a and 17b clearing the belt 18, and then they are placed onto the conveyor belt 11a—11b. Thereby an abutting position of the cards on the belt with respect to the lugs 17a and 17b is ensured. In FIG. 3 is shown one card 100 in its position on the belt 11a—11b.

Upon running of the motors 15 and 200, cards will be fed successively onto this belt 11a—11b and the cards are spaced from each other by these lugs 17a and 17b.

Turning now to FIGS. 5 and 6, there is shown first the continuation of the conveyor belt 11a—11b engaging idler guiding sprocket wheels or drums 20 and 21. The upper portion of the belt 11a—11b runs over a table 22 which is provided with five windows 22A, 22B, 22C, 22D and 22E. There are positioned below these windows altogether five light sources 23, each one pertaining to one read-out station A thru E. In the light path of each one of the light sources there are provided sets of nine plates, each set dividing the light coming from each source into ten parallel light paths. There are five groups of ten light paths each, 26A to 26E.

These light paths for each light source are spaced from each other by a distance which equals precisely the distance —X— between neighboring dots on the cards like card 100 to be read out (see FIG. 4). In FIGS. 5 and 6 one can see that above each light source i.e. in each window is positioned a card.

In a cabinet like housing portion 10' inside of housing 10 and above the flat upper portion of the conveyor belt 11a—11b on which the cards are transported, there are provided five turrets 31, 32, 33, 34 and 35 pertaining to the read-out station A to E respectively. The turrets are rotatably mounted on a stationary shaft 25. Each turret is driven by a chain gear denoted with reference numeral 41, 42, 43, 44 and 45. The shaft 25 is provided with spacer rings such as shown in FIG. 5 for the turret 35 and denoted with reference numerals 36 and 37.

In FIG. 5 is furthermore shown a hub 38 for turret 35 which is rotatably mounted between the two spacer rings 36 and 37 on the shaft 25. The turret structure is comprised by a frame 35' which is secured to hub 38 which is driven by chain 45. The purpose of these spacer rings 36 and 37 is to position the turret 35 precisely above the ten light channels of window 22E so that they index with a bank of photocells 55 which is composed of altogether ten photocells 51a, 51b, 51c, 51d, 51e, 51f, 51g, 51h, 51i and 51k. The ten light channels 26E in window 22E have the index precisely with the photocells 51a through 51k. The bank of photocells 55 is stationarily secured to the housing 10 by a supporting rod 55' extending into turret 35.

The other turrets 31 to 34 are constructed similar to turret 35, and similar banks of photocells are provided therein.

It will be apparent from FIG. 5 that during readout, a card, like card 100, will be positioned so that each of its csolored dots a, b, c, d, e, f, g, h, i, and k, will be precisely aligned with and positioned in the light path for one of the photocells 55a to 55k being identified by the same letter as subscript.

Each one of the chains 41 to 45 are driven by a reel 61 to 65, respectively. All these reels 61 through 65 are mounted on a common shaft 66 which is driven via a gear 67 and a five leaf geneva wheel 68 by a motor 130. Upon running of motor 130 the geneva drive 68 causes the shaft 66 to move in steps whereby a relatively fast movement is followed by a fast movement, etc.

Along the circumference of each of the turrets are provided a plurality of color filters. In the present case, there are shown twenty-five filters mounted on each turret, whereby each turret carries five sets, each set comprising five different color filters.

For the purpose of describing the present invention it was assumed that each dot may be selected from altogether five colors, for example, blue, green, yellow, orange and red. The filters are so selected, that any filter of one set permits passage only of the light from a dot of the same color.

It shall be mentioned that the filters on a turret are mounted in the same succession, i.e., for example: blue, green, yellow, orange, red, blue, green, yellow—etc. Thus, always five successive filters form one complete set. This is important because wherever the turret stops is immaterial; when it is started again and makes five steps, a complete set of filters has passed in front of the respective bank of photocells.

Turning for a moment to the driving mechanism for the turret, the gearing transmission ratio of gear 67, and the ratio of the diameters between the hub wheel for each turret and the reel such as 61 to 65 has to be selected so that with one step of the geneva drive 68 one particular filter appears in front of the bank of photocells such as 55 in FIG. 5. The same, of course holds true for the other turrets, because all turrets move together, and, the banks of photocells such as 55 in FIG. 5 for turret 31 for all the other turrets 32 to 35 cooperate with these turrets in precisely the same manner. Upon running of motor 130 one filter after another is placed in front of its associated bank of photocell, remains there for a brief pause and then is succeeded by the next filter; this occurs simultaneously in all five stations A to E.

Now the ejection mechanism as illustrated in FIGS. 7 and 8 pertaining to the read-out station E shall be described. There is provided a gear wheel 71 which is driven by an ejection motor 240 in a manner which will be described in connection with FIG. 11. The wheel 71 meshes with a gear rod 72, the latter having a widened end portion forming a cross bar 72' having a width corresponding to the length of a card. Gear wheel 71 is positioned so as to engage the gear rod 72 through a window 22' of table 22. There is connected with this end portion 72' a frame 73 which engages the edge of the card opposite to the edge along which are positioned the dots.

It can be seen from FIG. 8 that the card, such as card 100 is positioned by the belt 11a—11b in cooperation with a pair of lugs 17a and 17b right inside of the frame 73. It was stated above that the cards will be passed under the photocells and the dots will be placed in aligned relationship with the light channels 26E such as shown in FIG. 5. Thus, this aligned relationship: light channels—dots—photocells is present when a card, such as card 100 is positioned right inside of frame 73.

It will, of course, be observed that similar frames are positioned for the other read-out stations A through D.

There is furthermore provided a chute 74 and a box or tray 85 positioned below the exit of the chute 74. There is provided another chute 76 in aligned relationship with the conveyor belt 11a—11b. This chute 76 feeds cards into the tray 12 (FIG. 1).

From the foregoing it will be apparent that after the card 100 has been scanned and probed with respect to its color dot combination, either one of two things can happen. First, the color dot combination was found to match a predetermined combination (this will be explained in connection with FIGS. 9, 10 and 11); in this case the ejection mechanism will be actuated and the gear wheel 71 causes the gear rod 72 to advance the frame 113 pushing the card 100 into the chute 74. The card will drop along the chute and be placed inside of the tray or box 85. This card then will be considered as having been ejected or sorted out by the read-out station E.

The second possibility is that the read-out station E rejects card 100 i.e. no matching relationship is found between the color dot combination of card 100 and the preselected combination in station E. In this case the ejecting mechanism will not be actuated, but upon continued movement, i.e. a restart of the conveyor belt 11a—11b, the card 100 will be placed on chute 76 which feeds the cards into the rejected-card-tray 12 which was shown in FIG. 1.

The device described thus far, briefly, operates as follows. Upon starting of the motors 200 and 15, the cards in tray 13 will be fed successively by the intermittingly operating feeding mechanism, including the pressure plate 19 on the belt 11a—11b; the cards thereby will be spaced for proper positioning by the lugs 17a and 17b. With belt 11a—11b still running the first card will be placed under the read-out station A. One of the lugs 17b has stopped the feeding motor via the limit switch LS, and the turret 31 in cooperation with the bank of photocells pertaining to this turret probes the colored dot pattern $a$ to $k$ of this card. Briefly, this probing process includes every one of the five consecutive filters of each turret are placed between the card to be probed and the bank of photocells associated with that turret. The stepwise movement of all the filters is carried out by the turret 130 motor, driving geneva drive 68.

After completion of this probing step, the conveyor belt 11a—11b is moved again until this card is placed under the photo-electric cells of read-out station B while the next card is placed under the bank of photocells of read-out station A. The reading or probing process is repeated in Station A and also carried out in station B.

The probing continues in that in steps the cards are moved along table 22 and come to a halt under succeeding read-out stations where they will be probed as to the color combination of their dots. If the color dot combination matches a predetermined one as selected in any of the read-out stations, the ejection mechanism associated therewith is activated and a frame, such as 73 illustrated in FIG. 8 for station E, pushes the card in one of the trays 81 to 85 associated with such read-out station. Of course, this card then is eliminated from further probing. As a card passes under all of the read-out stations and has not been ejected by any one of them, such card will be dropped into the rejected-card-tray 12 via chute 76.

Turning now to the description of the actual probing process of the cards and the control of the feeding motor 200, turret motor 130 and ejection mechanism with motor 240, attention is drawn to the FIGS. 9, 10 and 11.

As stated above, in FIG. 9 is illustrated the photo-electric detector channel which probes the color of one dot, in this case dot $a$. There is first shown again the card 100 in cross-sectional view and there is also shown this one dot, $a$, being under observation by photocell 55a. The output of photocell 55a is fed to a power amplifier 101a and both, photocell and amplifier, are fed with electric current from power supply lines L1 and L2. The output of amplifier 101a controls the coil of 102a of the relay having a resting contact 103 and an operating contact 104. Operating contact 104 is connected via a line 113 to a brush 114 which makes electric contact with a hub 129 of a shaft 112. Hub 129 pertains to a selector switch 120a. The shaft 112 is geared to and integral with another shaft 109, having also a hub 129' which makes electric contact with a brush 107. A line connection 104 connects the resting contact 103 to a stationary contact terminal 106. Terminal 106 makes contact with an arm 108a when the latter is in a particular position; then an electric circuit is defined feeding the voltage potential of line L1, to brush 107.

Brush 107 is connected to a line 136 which in turn is connected to a relay coil 126a. A contact glider arm 119 is in electrical and mechanical connection with hub 129 of selector switch 120a. Arm 119 is to successively engage circularly arranged contact plates or terminals 121, 122, 123, 124 and 125 pertaining also to selector switch 120a. These contact terminals 121 to 125 are electrically connected to contact plates or terminals 131, 132, 133, 134 and 135, respectively, of a rotary switch 137a, having furthermore a glider arm 138 which may successively contact these terminals 131 to 135. The glider arm 138 is in permanent mechanical and electrical contact with a hub 141 which engages a stationary brush 142. Brush 142 is connected to a line 143 interconnecting the brush 142 and the relay 126.

Hub 141 is rotatably connected by a shaft 144 to the geneva wheel 68 driven by the turret motor 130 as outlined above.

There is furthermore provided an adjustment knob 110a rotating the shafts 109 and 112 for the selection of any of altogether six different positions including five positions designated with reference numeral 111 and a sixth position designated with 111'. If knob 110a is in any of the 111-positions, arm 119 of switch 120 contacts any of the terminals 121 to 125. If knob 110a is in the 111'-position, arm 108a contacts terminal 106.

The relay 126a has a holding blade 127a and an operating blade 128a. The relay 126a is connected with one side to the power line L2 via a switch 245 and a contact blade 209 which will be described in connection with FIG. 11. The relay 126a on the other hand is permitted to be connected to power line L1 either via line 136, brush 107, contact arm 108a, contact terminal 106, line 105, resting contact 103 of relay 102a to the line L1. Alternatively, relay 126a may be connected to the power line L1 via brush 142, hub 141, contact arm 138, any one of the contact terminals 131 to 135, the corresponding i.e. interconnected one of the contact terminals 121 to 125, contact arm 119, hub 129, brush 114, line 113 and operating contact 104. Also, of course, relay 126a can be connected directly to the power line L1 via its own holding blade 127a.

As stated above in connection with FIGS. 1 to 8, the geneva drive 68 is of the five-leaf-type, driving the turrets which carry the filters to be placed in front of the photocells. It will also be recalled that by successive steps as produced by the geneva drive, successive filters are placed into proper position between the dots to be observed and the photocells. It will further be recalled that in the instant case from five different colors the color of the dots are to be selected, and therefore each turret includes several sets of filters each set being composed of five different color filters, for these five colors.

Upon one complete revolution of geneva drive 68, one complete set of five filters of the five different colors has passed in front of the observing photocells in the example about to be described. Thus, five filters of different color transparency will be placed between the photocell 55a and the dot a when geneva drive 68 has completed one revolution.

Simultaneously with the completion of one revolution of geneva drive 68 the latter also rotates the shaft 144 with glider arm 138. For each filter placed in front of photocell 55a, the glider arm 138 contacts a different one of the contact terminals 131 through 135. Therefore, each of the conact terminals 131 to 135 is associated with a particular filter then placed in front of cell 55a.

In view of the provision of line connectors between the contact terminals of rotary switch 137a and of selector switch 120a, each of the contact terminals 121 to 125 is also associated with a particular color and a particular filter. Rotary arm 119 is adjusted by knob 110a with respect to the contacts 121 to 125. Thus, each of the positions 111 of knob 110a is also associated with a particular color.

It was stated, that the positioning and contacting of contact arm 138 with any of the contacts 131 to 135 corresponds to a particular filter then being placed in front of photocell 55a. Suppose the photocell 55a was energized when a momentarily present filter had the same color as the dot probed. At that instant the relay 102a is energized and its blade makes contact with operating contact 104 which just becomes directly connected to power line L2. Also, glider arm 119 assumes the voltage potential of line L1. The particular position of contact arm 119 depends on the adjustment of knob 110a; the particular contact terminal of switch 120a contacted by arm 119 now is also connected directly to positive line terminal L1. Contact arm 138, moving with the turrets contacts that one of terminals of switch 137a which is associated with the particular color of the filter in front of cell 55a. An electric circuit through contact arm 138 and line 143 and relay 126a is defined only, if the contact arm 119 actually makes contact with that one of the contacts 121 through 125 which is also associated with the color. If this is the case the relay 126a becomes energized. Therefore, if the knob 110a for this particular case had positioned the arm 119 so as to enable the completion of an electric circuit for relay 126a, this color for dot a is to be considered the preselected one. If however knob 110a had placed arm 119 into another position for pre-selecting a different color, relay 126a remains unenergized. Therefore, the five positions 111 among which the knob 110a can select, renders the selector switch 120a responsive to a pre-selection of colors; and switch 120a determines whether the output of the photocell 55a produced when the dot color is the same as a filter color is suppressed or accepted. If the output is suppressed no coincidence is present between pre-selected color and observed color, relay 126a remaining unenergized if the photocell output is accepted such coincidence is present relay then being energized.

The knob 110a also adjusts a contact glider arm 108a and only at one particular position, 111' of knob 110a, this arm 108a is effective so as to interconnect the resting terminal 103 to the relay 126a. In this particular case an electric circuit is defined regardless of any position of rotary switch 137a as long as the photocell 55a is not energized. In view of the fact, that during one probing step, five filters are placed in front of photocell 55a while the dot a can have only one color, at least four during different filter positions (five times if the dot is black) relay 102a will remain unenergized, and therefore relay 126a will be energized. Thus, position 111' of knob 110a means selection of "any color for dot a."

For further facilitating the understanding of the operation of this detector device, it will be assumed that interconnected contact terminals 121 and 131 are associated with the color blue; 122—132 are associated with green; 123—133 are associated with yellow; 124—134 are associated with orange; and 125—135 are associated with red. The terminal 106 is associated with black of any other color.

This association, of course, means that if arm 138 contacts plate 131, a blue filter is simultaneously positioned in front of photocell 55A. An orange filter is positioned in front of photocell 55A if arm 138 contacts plate 132, etc.

Whenever the filter in front of photocell 55a corresponds to the color of the dot also in front of the photocell 55a, the relay 102a places its blades so as to engage operating terminal 104, but an electric circuit for energizing relay 126a can only be completed if the adjustment of knob 110a was also set for this particular color, otherwise no energization of relay 126a can result. Of course, the relay 126a will be energized regardless of the color of dot a, if the knob 110a was adjusted to the position 111' selecting "any color" in this case the blade of relay 102a remains sufficiently long in the engaging position with resting terminal 103 during at least the positioning of four different filters in front of photocell 55a, and relay 126a once being energized closes its blades 127a and 128a and remains closed by its holding circuit.

The current through the energizing coil of relay 126a is to be considered an "output" as produced by the detector circuit or channel associated with and probing dot "a" on any card; energization of this channel occurs only if the pre-selected color is adjusted by knob 110a coincides with or matches the color of the dot observed by photocell 55a. The relay 126a remains unenergized if no such output is produced. In particular, only in case of the presence of such output the operating blade 128a is closed; the effect thereof will be explained with reference to FIGS. 10 and 11.

Turning now to FIG. 10 it is readily understood that the circuit network as illustrated therein is a combined detector circuit network for observing the complete color or dot pattern of one card by one read-out station.

There are altogether ten detector channels which are distinguished from each other by subscripts "a" through "k." Each one of these detector channels is comprised of the elements as described for one channel in FIG. 9. Thus, there are altogether ten selector switches 120a to 120k with knobs 110a to 110k, respectively; there are ten rotary switches 137a to 137k, the arms of which being positioned all on the same shaft together with the Geneva drive 68 or being geared thereto, and there are ten output relays 126a to 126k. There are also ten "any color" selector arms 108a to 108k.

The salient feature of this network is that the operating blades 128a through 128k defines, when closed, a series circuit for energizing a relay 230. The energization of relay 230 can only occur if the color dot combination of a card under observation precisely coincides with the color dot combination as selected by all of the ten selector switches 120a through 120k. Only in case of such complete coincidence, relay 230 is energized, in any other case it remains de-energized. Thus, the actuation of relay 230 occurs when all detector channels have produced an output as defined above, and relay 230 is responsive to a combination of all these outputs.

The circuit network as disclosed in FIG. 10 and described in connection therewith, provides a coincidence circuit probing the color dot pattern of the cards under observation and an output is produced whenever complete coincidence is present between the color dot pattern on a particular card under observation and the combined adjustment selected by the ten different selector switches; relay 230 is therefore a coincidence relay.

The circuit network of FIG. 10 can also be described as a recognizing circuit probing whether or not there is a matching relationship between a predetermined adjustment for a color dot combination and an actual color dot combination on a card under observation, whereby an output in this coincidence relay 230 is produced in case there is in fact present such a matching relationship; no output is produced for actuation relay 230 or by this relay 230 in any other case.

One can also say that the relay 230 is responsive to an "accept–reject" detection by the detector channels for a particular card. Also, relay 230 defines a "yes" or "no" detector for color combination detection.

In connection with FIG. 11, it will be explained how this output is utilized to automatically control rejection or ejection of a card and how a control for the feeder motor is influenced thereby.

FIG. 11 has to be understood as consisting of two portions which are separated by a horizontal dashed line. The circuitry below the dashed line repeats the coincidence network for one read-out station, for example, read-out station E (relays 126a to 126k) with coincidence relay 230, and it further includes the circuit network for providing automatic energization of the ejecting mechanism.

The upper part of the FIG. 11 pertains to the driving circuit for all of the read-out stations A to E, as well as for the advancing mechanism for the conveyor belt transporting the cards to be read out, along the five read-out stations.

Turning first to the lower part of FIG. 11 which is the continuation of FIG. 10, there is the bank of the ten coincidence relays 126a to 126k, with their operating blades 128a through 128k. As was mentioned in connection with FIG. 10, when all the blades 128a through 128k are closed due to an energization of all of the ten relays 126, an electric current path is defined for energization of the coincidence relay 230 which thus closes its blades.

There is first a holding blade 231 for this coincidence relay 230, keeping it energized independent of the energization of the detector channels relays 126a through 126k. Coincidence relay 230 has a second blade 232 controlling the current to a first motor winding of the rejection motor 240.

Relay 230 may only be energized when a blade 239 which is connected in series therewith, is closed which normally is the case; the function of blade 239 will be explained later.

Motor 240 may only be energized for rotation in one direction by the closing of blade 232, if also a blade 233 pertaining to a motor reversing relay 234 is closed; that also is normally the case, the relay 234 then being unenergized.

The motor 240 drives the gear wheel 71 which was already shown in FIG. 8, driving the gearing rod 72. Normally, the gearing rod 72 is in the retracted position as illustrated in FIG. 11 which, considering again FIG. 8 is a position in which a card may be placed into the frame 73 to be moved by the gearing rod 72 for card ejection.

Limit switch LS1 is placed in the feeding line 238' for a read-out terminating relay 238; line 238', in this position of limit switch LS1 is connected to line 242 and power line L, however, open blade 236, pertaining to relay 234, keeps relay 238 unenergized, and blade 239 remains closed as outlined above.

To complete the description of the ejection circuit, there is furthermore provided a second limit switch LS2 which keeps a line 234' disconnected from power line L1, which means that limit switch LS2 is open when disengaged from rod 72. In case rod 72 engages limit switch LS2, the latter will close, and line 234 will be connected to power line L1; thus in the retracted position of rod 72 as shown, relay 234 is not energized.

Ejection motor reversing relay 234 has four blades; first, a holding blade 236' keeping relay 234 energized once energization has been initiated. This holding blade 236' is governed by a blade 237 of relay 238. 236 is the normally closed blade of relay 234 being placed in series circuit connection with relay 238 as mentioned; read-out terminating relay 238 can only be energized when rod 72 engages limit switch LS1 after having engaged limit switch LS2 for initiating energization of relay 234. The third blade governed by relay 234 is its main control blade 235 providing for a closing of a feeder circuit for motor 240 for reversal thereof so as to retract rod 72. The fourth blade of relay 234 is blade 233 being kept closed when the relay is unenergized.

The coincidence circuit for this particular read-out station E is completed by an on-off switch 245 which places this read-out station into or out of operation; this is indicated by two signaling lamps of the glow-discharge type, indicating the "on" and the "off" position for this station.

It will further be observed that the relay 230 has a third blade indicated with reference numeral 255 which is one of the links of the circuit described thus far to the control circuit for the feeder motor 200 and the turret motor 130 for the entire arrangement i.e. all the read-out stations. Blade 255 is positioned in the energizing circuit for a relay 241.

The other link between the network of Station E and the main control circuit for all stations is a blade 209 which, when closed defines a supply circuit for the holding circuit for the coincidence relays 126a through 126k. Blade 209 was also already shown in FIGS. 9 and 10.

The circuit network is shown in its initial position in case station E is "on."

If one assumes that a particular read-out is in progress, relay blade 209 is closed which will be explained later. Assuming further no coincidence has been observed, then not all of the relays 126a to 126k are energized or maybe none of them. In this case, the coincidence relay 230 remains unenergized and the rest of the circuit network below the dashed line remains in a state as illustrated. After a predetermined delay, which also will be explained later, the only reaction observed is the opening of blade 209 bringing all of the relays 126a to 126k back into their unenergized state, in interrupting their holding circuits.

Suppose a read-out is completed, and a complete coincidence has been observed and detected, thus all relays 126a to 126k are closed for energizing the coincidence relay 230. In this case, the "output" for initiating an ejection is present and the following operation takes place.

Coincidence relay 230 upon energization first closes its holding blade 231; also blade 232 is closed and thus ejection motor 240 starts to run. In this case, the ejection rod 72 with its frame 73 (FIG. 8) moves forward to the left and, as was described in connection with FIG. 8, the card is pushed from the main conveyor belt. When rod 72 is moved from engagement with limit switch LS1, the opening of the connection between lines 242 and 238' has no effect.

When rod 72 engages limit switch LS2, the ejection is completed and ejection motor reversing relay 234 becomes energized. Its own holding circuit is defined by the now closed blade 236'. The energization of relay 234 effects also the closing of blade 236, however, in view of the fact that the limit switch LS1 has energized relay 241 and opened the circuit for relay 238, the latter still can not be energized.

Relay 234 also now opens blade 233 and interrupts the feeder circuit for motor 240, but blade 235 closes another feeder circuit for motor 240, which now starts to run in the opposite direction thereby returning or retracting rod 72.

Limit switch LS2 becomes disengaged but its opening is yet ineffective in view of the fact that motor reversing relay 234 remains energized by its own holding circuit and therefor motor 240 continues to retract rod 72.

If now the rod 72 again engages limit switch LS1, this switch closes a circuit for ejection termination relay 238 in view of the fact that energized motor reversing relay 234 still remains closed its blade 236. The energization of ejection termination relay 238 first causes blade 237 to open, interrupting the holding circuit for relay 234 and thus bringing motor 240 to stop by opening of blade 235. Simultaneously, with the energization of relay 238, its blade 239 is opened, interrupting the holding circuit for coincidence relay 230. De-energization of relay 230 produces also opening of blade 232. Thus the simultaneous or slightly delayed reclosing of blade 233 due to de-energization of relay 234 has no effect on the motor 240 because of opening of blade 232; thus motor 240 remains in its stopped position thereby keeping rod 72 retracted.

Upon de-energizaiton of relay 230, its blade 255 closes again to be effective in the restarter control circuit for the motor 200. This control circuit shall now be described.

There is the main switch 201 which provides power for the entire device, particularly for the power line L1 which is to feed a positive potential to all of the circuits involved in this case. There is a motor control relay 202 which is governed by a motor starter switch 203. There is further provided a holding blade 205 for motor control relay 202 which is in circuit with normally closed limit switch LS; this is the same limit switch LS as described in connection with FIGS. 2 and 3.

There is provided an automatic restarting circuit for the starter relay 202 including a blade 269' of a restarter relay 241 which was briefly mentioned above. A switch 206 having a position as illustrated, puts the entire circuit network under automatic operation. If switch 206 is in its other position, the device becomes hand operated and there is a starter switch 204 for this case.

There is furthermore provided a plurality of glow-discharge lamps indicating whichever circuit is in operation.

Relay 202 has a second blade, 207, for controlling the power supply to the feeder motor 200. This motor 200 is the main transport for advancing the conveyor belts 11a—11b and the cards thereon which feature was described in connection with FIGS. 1 to 8. Motor starter relay 202 has a third blade, 210, governing the energizing circuit for relay 212 which is a turret motor starting relay.

Normally, blade 210 is closed, but turret motor starting relay 212 is still unenergized because the limit switch, having a second blade LS' which is open.

Turret motor starting relay 212 has a first blade 211 which provides for an interlocking effect between turret motor 130 and feeder motor 200; blade 211 is in circuit with the energizing circuit for the feeder motor 200. Relay 212 then has its main control blade 213 in series with turret motor 130.

It will be apparent from the cooperation of the relays 202 and 212 that the relay 202 closes its blade 207 for providing a current path to the feeder motor 200 but simultaneously opens blade 210 interrupting the energization circuit for the turret motor relay 212. On the other hand, if the relay 212 is energized closing its control blade 213 for starting the turret motor, it opens its blades 211 thus stopping motor 200. Thus, motors 200 and 130 can only run alternately and they never run simultaneously. However, in view of blade 243 in circuit with motor 130, both motors may stop simultaneously.

Considering the purpose of turret motor 130 described in connection for example with FIG. 9, it will be apparent that this mutual exclusive running of the motors 200 and 130 means that the turret motor 130 places successively filters in front of the card probing photocells only run when the cards are at a complete stop; cards will only be advanced by the running of motor 200 when the turret motor 130 is at rest, thus not providing for a scanning or probing operation.

In circuit with turret motor 130 is a relay 256 controlling the power supply to the relays 126a to 126k. Thus the latter may only be energized when the turret motor runs for a probing operation to be carried out only when motor 200 has stopped. Blade 209 is closed only when deactivator or activator relay 256 is energized.

Relay 212 has a third blade, 214, being connected in series circuit connection with resistor 215 and an illuminating light 215' indicating when the turret motor 130 is running and that a read-out is in progress.

There is a fourth blade denoted with reference numeral 217 and associated with relay 212, governing the current supply circuit to a delay network 216. The motor starter relay 202 has also a fourth blade, 218, which is closed when relay 202 is unenergized, and which is also connected in series with the delay device 216. Thus, delay device 216 is energized, when feeder motor 200 is at rest but turret motor 130 runs. The delay device 216 governs a first blade 219 which is connected in circuit with restarter relay 241 which relay was mentioned above.

Delay network 216 governs a second blade 243 being normally closed in circuit with turret motor 130 and relay 256. Therefore, delay 216 is started to run when turret motor starter relay 212 starts motor 130 and simultaneously closes blade 217; motor 130 is stopped after delay 216 has responded. Relay 256 therefore keeps its blade 209 closed only when the motor 130 runs.

Restarter relay 241 is furthermore governed by the five blades 251, 252, 253, 254 and 255. Blade 255 was mentioned above which is one of the output links of the circuit network described below for the coincidence and the ejection circuit network of station E. The blades 251 through 254 pertain to coincidence relays of read-out stations A, B, C and D, similar to coincidence relay 230 of the read-out station E as described.

On completion of the description, it might be mentioned that the deactivator relay 256 has four additional blades which have precisely the same function of blade 209. The blade 209 is to govern the power supply to the various detector circuits output, relays 126a through 126k of the read-out station E, and, particularly, blade 209 puts these coincidence relays into the unenergized state after every probing of the cards. The four other blades for relay 256 just mentioned have precisely the same functions for the detector coincidence relays for the stations A, B, C and D, corresponding to the relays 126a to 126k of station E.

Upon placing switch 201 into the "on" position, power line L1 will be energized. Now button switch 203 will be closed temporarily by the operator and motor starter relay 202 will be energized thereby closing its holding blade 205 and the motor control blade 207; thus, the motor 200 starts to run. It will be appreciated from the description of FIGS. 1 to 8 that starting of motor 200 means that cards will be advanced by the conveyor belt. This proceeds until one of the lugs 176 of the conveyor belt 11a—11b (FIG. 3) opens that one of the contacts of limit switch LS which interrupts the holding circuit for relay 202; blade 207 opens and motor 200 comes to a complete stop. Simultaneously the other contact LS' of limit switch LS closes the energization circuit for relay 212 and upon stopping of motor 200 the blade 210 completes a circuit for this turret motor starter relay 212 which becomes energized closing its blades 213, 214 and 217 but opening its blade 211 which forbids any possible restarting of feeder motor 200 while relay 212 is energized.

Upon closing of main control blade 213, the turret motor 130 starts to run and will place, as described above, the filters in front of all the read-out stations. Simultaneously relay 256 is energized, closing its blade 209 thus rendering the relay network 126a to 126k responsive to any coincidence between dot color and predetermined color (see FIGS. 9 and 10).

The photocells and filters now probe the dots color by color and detect the color of the dots of the cards which are placed in alignment with a respective bank of photocells. In view of the fact that the blade 218 was closed when the motor 200 stopped and that blade 217 is closed when the turret motor runs, the time delay 216 has started to run. After a time sufficient to place at least five different filters in front of all the photocells, time delay 216 responds and opens its blade 243 thus stopping the turret motor 130.

Suppose no read-out and no complete coincidence has been observed anywhere i.e. by any of the stations A to E, then all of the blades 251 to 255 remain closed, thus, when the delay 216 responds, it also causes blade 219 to close, energizing restarter relay 241; the latter closes blade 209'. Simultaneously relay 256 was deactivated and any of the relays 126a to 126k which did respond is deactivated.

The closing of blade 209' defines an automatic restarting circuit for the relay 202 which now becomes energized and closing its blade 207 and opening the blade 210 for de-energizing the relay 212 the latter now causing the blade 211 to be reclosed; now the conveyor motor 200 can start again. Simultaneously, with the restarting of motor 200 the limit switch LS will close the holding circuit for relay 202 and the motor 200 is kept running even though relay 241 has been de-energized and blade 209' has opened, because upon energization of relay 202 the blade 218 opened and interrupted the delay circuit 216, blade 219 opens; consequently relay 241 is de-energized opening blade 209; de-energization of delay 216 closed blade 243 again, but de-energization of relay 212 opened blade 213; thus, relay 256 remains unenergized. It might be mentioned that the blades controlled by delay 216 preferably respond rather slow upon deactivation of delay 216. The cycle is repeated as the limit switch LS1 is opened again, thus causing again motor 200 to stop and turret motor 130 to automatically restart, and a new probing can commence.

Suppose that during the next reading or probing of the cards, one of the coincidence relays or more of them become energized. This means that one or more of the contacts 251 to 255 will open immediately and will remain open until the ejection of this respective card has been completed as described above. If one of the contacts 251 to 255 are open restarter relay 241 cannot respond. After completion of the ejection, the coincidence relay or relays, such as 230 is de-energized and the opened ones of the blades 251 to 255 are closed again. In the meantime, the delay 216 was running and had closed its blade 219, but restarter relay 241 will only be energized after all the read-outs are completed and after all the ejection of these cards for which coincidence was found by any or all of the read-out stations have also been completed. Reopening of blade 243 is not influenced by any ejection, and therefore the turret motor 130 is stopped and deactivator relay 256 erases any response in any of the coincidence relays such as 126a to 126k.

Now restarter relay 241, after completion and termination of ejection, will finally be energized closing its blade 209' for initiating another run of motor 200 for the transporting of the conveyor belt 11a—11b.

The invention is not limited to the embodiments described above but all changes and modifications thereof not constituting departments from the spirit and of the invention are intended to be covered by the following claims:

What I claim is:

1. A record card read-out arrangement comprising: means for positioning a record card in a probing position, said card being identified by a combination of spatially separated colored dots selected from a number of predetermined colors, said dots being arranged in a predetermined pattern; a plurality of color filters; light sensitive means, means for placing a predetermined filter combination in front of said light sensitive means so that the colors of said dots are probed when said card is in the probing position; and an adjustable coincidence circuit network connected to said light sensitive means and further connected for adjustment to said filter placing means for matching the observed color combination against a predetermined color combination.

2. A record card read-out arrangement comprising: means for positioning a record card in a probing position, said card being identified by a combination of spatially separated colored dots selected from a number of predetermined colors and being arranged in a predetermined pattern; a plurality of color adjustable, color sensitive light detectors, each one probing the color of one dot when said card is positioned in aligned relationship with said detectors; a like plurality of selector circuit networks connected to said light detectors respectively, each producing an output signal when the dot, as observed by the connected detector has a predetermined color; and a coincidence circuit connected to be responsive to the occurrence of all of said output signals producing a common output when all of said dots have a predetermined color combination pattern.

3. A record card read-out arrangement comprising: means for positioning a record card in a probing position, said card being identified by a combination of spatially separated colored dots selected from a number of predetermined colors and arranged in a predetermined pattern; a plurality of color-adjustable light sensitive detectors, each one probing the color of one dot when said card is being positioned in said probing position; a like plurality of selector circuit networks electrically connected to said light detectors, respectively, whereby each network produces an output when the dot observed by the connected detector has a predetermined color; a coincidence circuit connected to be responsive to all of said outputs as produced by said selector circuit networks and producing a common output when all of said dots on the card in probing position have a predetermined color combination pattern; and an ejector mechanism operated in response to said last mentioned output for disposing of said card.

4. A read-out station for reading colored dot combinations on record cards, a plurality of detector channels, each channel comprising: a photo-electric detector circuit; means for rendering said circuit color selective taken from a number of preselected colors; adjustable switching means having switching positions corresponding individually to any of said colors; and electric circuit means interconnecting said photo-electric circuit and said last switching means and producing an output when the color of the dot probed by the said detector circuit corresponds to a pre-selected color.

5. A record card read-out arrangement comprising: means for positioning a record card in a probing position, said card being identified by a combination of spatially separated colored dots selected from a number of predetermined colors, said dots being arranged in a predetermined pattern; a plurality of color-adjustable, color sensitve light detectors, each one probing the color of one dot when said card is positioned in aligned relationship with said detectors; a like plurality of adjustable selector circuit networks connected to said light detectors, respectively, each network producing an output when the dot as observed by its associated detector has a color as predetermined by said selector; a coincidence circuit connected to be responsive to all of said outputs and producing a common output when all of said dots on the card in position have a predetermined color combination pattern, an ejector mechanism responsive to said last mentioned output for disposing of said card and producing an output signal upon completion of ejection; and means responsive to said signal from said ejector mechanism and re-starting said positioning means upon completion of ejection.

6. A read-out arrangement for record cards being identified by at least two colored dots placed thereon, the colors thereof being selected from a number of predetermined colors, comprising: a card conveyor; driving means for said conveyor; at least two photo-electric detectors disposed so as to observe a card on said conveyor, said photo-electric detectors having spatially separated effective light detecting ranges forming a pattern corresponding to the pattern of said dots on said cards; control means for said driving means; means for rendering said photo-electric detectors color selective; at least two selective switching means connected to said photo-electric detectors, respectively, each switching means adapted to accept and suppress any output as produced by the photo-electric detector to which it is connected; at least two control elements connected respectively to said switching means and said photo-electric detectors, each control element being responsive to a coincidence between the color observed by it associated photo-electric detector and a color selected by means of the selective switching means; circuit elements for combining the outputs of said control elements; and means interconnecting said last mentioned circuit elements and said control means for controlling said driving means in response to the observation of said photo-cells and for stopping movement of said card conveyor when the dots on a card are in the effective detector range of said photo-electric detectors so that upon observing the dots on a card each photo-electric detector observes one dot thereon.

7. A read-out arrangement for record cards being identified by at least two colored dots placed thereon, the colors thereof being selected from a number of predetermined colors, comprising: a record card conveyor; a driving motor for said conveyor; at least two photo-electric detectors disposed so as to observe the dots of one card on said conveyor, said photo-electric detectors having separated effective light detector ranges forming a pattern corresponding to the pattern formed by said dots on said cards; a control circuit connected to said motor means, switching in said control circuit for stopping said motor when the dots on a card are in the effective detector range of said photo-electric detectors so that upon observing a card each photo-electric detector means observes one dot thereon; means for rendering said photocells color selective; at least two selective switching means connected to said photo-electric detectors, respectively, each switching means adapted to accept and suppress any output as produced by the photo-electric detector to which it is connected; a coincidence circuit connected to said selective switching means and responsive to said outputs when accepted; an ejector including a driving member, a control circuit for said driving member connected to and controlled by said coincidence circuit for causing a card to be ejected upon coincidence of all possible accepted outputs; and circuit means interconnecting said control circuits for said motor and said driving member, and said coincidence circuit for selectively restarting said motor after completion of ejection or after at least one output of said photocell was suppressed so as to establish non-coincidence.

8. A read-out arrangement for record cards being identified by at least two colored dots placed thereon, the colors thereof being selected from a number of predetermined colors, comprising: a record card conveyor; driving means for said conveyor; at least two photo-electric detectors disposed so as to observe a card on said conveyor, said photo-electric detectors having spatially separated effective detector ranges forming a pattern corresponding to the pattern formed by said dots on said cards; control means connected to said driving means for stopping movement of said card conveyor when the dots on a card are in the effective detector range of said photo-electric detectors so that upon observing a card, each photo-electric detector observes one dot thereon; a plurality of filters interposable into said effective ranges of said detectors; at least two multi-position switching member with each position of each member corresponding to the particular filter in front of an associated photo-electric detector respectively; means for linking a switching member to the filters interposable at the associated detector; at least two selective switching means; circuit means for completing at least two detector channels each including a photoelectric detector, a switching member and a selective switching means, each channel adapted to suppress any output of said photo-electric detector for predetermined positions of said switching means; and a coincidence circuit responsive to the presence of unsuppressed outputs of all detector channels.

References Cited in the file of this patent

UNITED STATES PATENTS

| | | |
|---|---|---|
| 2,268,498 | Bryce | Dec. 30, 1941 |
| 2,592,202 | Smith | Apr. 8, 1952 |
| 2,899,132 | Orthuber | Aug. 11, 1959 |

OTHER REFERENCES

Supernowicz, et al.: "Character Sensing Device," IBM Technical Disclosure Bulletin, vol. 2, No. 3, October 1959.